United States Patent
Chaplin et al.

(10) Patent No.: US 12,024,588 B2
(45) Date of Patent: Jul. 2, 2024

(54) COPOLYMERS AND PROCESS FOR THEIR MANUFACTURE

(71) Applicant: VICTREX MANUFACTURING LIMITED, Lancashire (GB)

(72) Inventors: Adam Chaplin, Lancashire (GB); Don Thomas, Lancashire (GB); Ulutan Tahsin, Lancashire (GB); Martin Riley, Lancashire (GB)

(73) Assignee: VICTREX MANUFACTURING LIMITED, Lancashire (GB)

( * ) Notice: Subject to any disclaimer, the term of this patent is extended or adjusted under 35 U.S.C. 154(b) by 780 days.

(21) Appl. No.: 17/041,685

(22) PCT Filed: Mar. 28, 2018

(86) PCT No.: PCT/GB2018/050815
§ 371 (c)(1),
(2) Date: Sep. 25, 2020

(87) PCT Pub. No.: WO2019/186085
PCT Pub. Date: Oct. 3, 2019

(65) Prior Publication Data
US 2021/0009758 A1    Jan. 14, 2021

(51) Int. Cl.
C08G 65/40    (2006.01)
(52) U.S. Cl.
CPC ..... C08G 65/4093 (2013.01); C08G 65/4025 (2013.01); C08G 2650/40 (2013.01)
(58) Field of Classification Search
CPC . C08G 65/40; C08G 65/4094; C08G 65/4025
See application file for complete search history.

(56) References Cited

U.S. PATENT DOCUMENTS

| 4,717,761 | A |  | 1/1988 | Staniland |
| 4,774,314 | A |  | 9/1988 | Winslow et al. |
| 2017/0362379 | A1 |  | 12/2017 | El-Hibri et al. |
| 2019/0031908 | A1 | * | 1/2019 | Louis .......... C08G 65/4025 |
| 2020/0024393 | A1 |  | 1/2020 | Allcock et al. |

FOREIGN PATENT DOCUMENTS

| CN | 105524416 A | 4/2016 |
| EP | 0001879 A1 | 5/1979 |
| EP | 0182648 A2 | 5/1986 |
| EP | 0244167 A1 | 11/1987 |
| EP | 3049457 A1 | 8/2016 |
| WO | WO 2014/207458 | 12/2014 |
| WO | WO 2017/153290 | 9/2017 |
| WO | WO 2017/186922 | 11/2017 |
| WO | WO 2018/024744 | 2/2018 |

OTHER PUBLICATIONS

Int'l Search Report and Written Opinion for PCT/GB2018/050815, dated Jul. 25, 2018 (10 pages).
Carlier et al. "Nucleophilic cleavage of activated aryl ethers by a fluoride anion" Polymer 34, 167-170 (1993).
Croshaw et al. "Melt-state degradation mechanism of poly (ether ketone ketone): the role of branching on crystallization and rheological behavior" Polym. Degrad. Stabil. 200, 109968 (2022).
Garcia-Leiner et al. "Structure-Property Relationships in Commercial Polyetheretherketone Resins" J. Polym. Eng. Sci. 57, 955-964 (2017).
Jonas et al. "Thermal stability and crystallization of poly(aryl ether ether ketone)" Polymer 32, 2691-2706 (1991).
Shrivastava, A. (2018). Introduction to Plastics Engineering, Chapter 2: Polymerization, 17-48 (34 pages).

* cited by examiner

*Primary Examiner* — Shane Fang
(74) *Attorney, Agent, or Firm* — Casimir Jones, S.C.; Anne M. Reynolds

(57) ABSTRACT

A method for manufacture of PEEK-PEDEK copolymers is described herein, along with copolymers formed by the method and their use. The method includes a nucleophilic polycondensation of a mixture of dihydroxybenzene and dihydroxybiphenyl with 4,4'-dihalobenzophenone in a reaction mixture comprising sodium carbonate and potassium carbonate, in an aromatic sulfone solvent, at a reaction temperature rising to a temperature from 280° C. to 330° C. immediately prior to the addition of a reaction-stopping salt, such as LiCl or $Li_2SO_4$, to the reaction mixture. Further organic dihalide is subsequently added to the reaction mixture for end-capping of the copolymer. The resulting copolymer has reduced chain branching and reduced melt viscosity at low shear rate compared to prior art copolymer of comparable molecular mass.

16 Claims, No Drawings

COPOLYMERS AND PROCESS FOR THEIR MANUFACTURE

CROSS-REFERENCE TO RELATED APPLICATIONS

This application is a national stage filing under 35 U.S.C. 371 of International Application No. PCT/GB2018/050815, the contents of which are fully incorporated herein by reference.

TECHNICAL FIELD

This invention relates to a manufacturing method for copolymers having -ether-phenyl-ether-phenyl-carbonyl-phenyl-(EEK) and -ether-phenyl-phenyl-ether-phenyl-carbonyl-phenyl-(EDEK) repeat units, known as PEEK-PEDEK copolymers. The invention also relates to the copolymers obtainable by the method and uses of the copolymers.

BACKGROUND

There is a wide range of thermoplastic polymeric materials available for use in industry, either alone or as part of composite materials. However, industry is constantly demanding materials with properties that are improved in at least some respect over existing materials.

Polyaryletherketones (PAEKs) such as polyetheretherketone (PEEK) are often used. PEEK is the material of choice for many commercial applications because it is highly crystalline and has outstanding chemical resistance properties. PAEKs, particularly including PEEK, can be manufactured by nucleophilic polycondensation of bisphenols with organic dihalide compounds in a suitable solvent in the presence of alkali metal carbonates and/or bicarbonates or alkaline earth metal carbonates and/or bicarbonates. Such processes are set out, for example, in EP0001879A, EP0182648A, EP0244167A and EP3049457A.

Polyphenylene sulphide (PPS) is a known polymeric material with a relatively low melting temperature (Tm) of 290° C.; however its glass transition temperature (Tg) is 85° C. to 100° C. which is too low for some applications. On the other hand, polyetheretherketone (PEEK) has a suitable Tg of 143° C. but its Tm of 343° C. is much higher than desirable. Nonetheless, PEEK is the material of choice for many commercial applications because it is highly crystalline and has outstanding chemical resistance properties.

Copolymers of PEEK and PEDEK are disclosed in U.S. Pat. No. 4,717,761, which describes a polymer containing -ether-phenyl-ether-phenyl-carbonyl-phenyl- (i.e. PEEK) and -ether-phenyl-phenyl-ether-phenyl-carbonyl-phenyl- (i.e. PEDEK) repeat units. WO 2014/207458 A1 discloses PEEK-PEDEK polymeric material manufactured by a process comprising polycondensing a mixture of at least one dihydroxybenzene compound and at least one dihydroxybiphenyl compound in the molar proportions 65:35 to 95:5 with at least one dihalobenzophenone in the presence of sodium carbonate and potassium carbonate.

The resulting copolymer when of suitably high molecular mass to give a tough polymer, and in a molten state, has a high viscosity at low shear rates, but is less viscous when subject to higher shear rates. This high melt viscosity at low shear rates can lead to problems when forming complex shapes from the polymer melt, particularly when forming objects by additive manufacturing (AM, such as selective laser sintering—SLS).

Hence, there is a need for a high performance PAEK polymer with a reduced melting temperature compared to PEEK, excellent chemical resistance and low viscosity when subject to low shear rates in a molten state.

Also, while PAEK copolymers may exhibit mechanical properties that are acceptable in a number of applications, it would be beneficial to provide PAEKs that demonstrate good mechanical properties, such as fracture toughness, in combination with reduced viscosity at low shear rates. Fracture toughness testing measures the energy required to propagate a crack through a test bar until the bar breaks. The propagation of a crack requires less energy in brittle materials than in ductile/tough materials. A material with higher fracture toughness characteristics is better suited than a material with lower fracture toughness for use in thicker walled parts (e.g. stock shapes including rods, machined components, in extruded and injection moulded articles such as pipes and casings and in composites generally).

Furthermore, there is a need in a number of areas (for example in the electronics industry for components for mobile phones, tablets etc.) for thermoplastic polymeric materials that exhibit as light or as white a colour as possible, e.g. compositions that exhibit a higher lightness, L* (according to the 1976 CIE L* a* b* colour space). Components manufactured from such compositions are useful because they enable ease of colour matching with similarly white-coloured components. It is easier to adjust the colour and/or match (e.g. by addition of colourants) a lighter polymer compared to e.g. the light brown/beige colour of known PEEK-PEDEK copolymers. Furthermore, in general, light or white polymers and lighter or whiter components made therefrom are desirable since whiteness implies higher purity and quality.

Additionally, it would be beneficial to provide a PEEK-PEDEK copolymer that exhibits a lower incidence of gel formation. PAEKs generally have a tendency to contain small amounts of very high molecular mass, branched and cross-linked material, which can cause visual defects, particularly evidenced in thin films and commonly known as fish-eyes. Such defects reduce the effective yield of good quality, defect-free polymer film, and hence increase the amount of material that must be scrapped. Gels can also lead to processing, quality and yield issues in the manufacture of melt-spun fibres.

A conventional commercial route for the formation of PAEKs and particularly PEEK-PEDEK copolymer is by nucleophilic polycondensation of one or more bisphenols with one or more organic dihalide compounds, in the presence of alkali metal or alkali earth metal carbonates or bicarbonates, leading to the presence of organic dihalide compounds as residual impurities in the resulting polymer. Even after extensive washing of the polymer by solvents, residual levels of organic dihalide compounds in the resulting PAEK, particularly levels of 4,4' difluorobenzophenone when this monomer is used for polycondensation to form the PAEK, may be undesirably high. If the PAEK is intended for use in contact with foods or pharmaceutical compounds, it is desirable to reduce the levels of such residues and/or to facilitate their removal from the PAEK.

Furthermore, the conventional nucleophilic polycondensation route may lead to residual polymerisation reaction solvent, typically residual aromatic sulfone solvent, such as diphenyl sulfone (DPS), being present in the PAEK, even after extensive washing of the PAEK with solvents intended to remove residual polymerisation reaction solvent. Such residual polymerisation solvent may lead to problems when the PAEK is subsequently processed by melt-processing such as extrusion or injection moulding. For instance the polymerisation solvent may migrate to surfaces leading to formation of localised solvent droplets or particles in a product, potentially generating product defects. It is thus desirable to reduce the levels of such polymerization solvent residues, such as DPS residues, and/or to facilitate their removal from the PAEK.

Accordingly there is a need for a PEEK-PEDEK copolymer material that has one or more of the following: reduced viscosity at low shear rates, improved mechanical properties, lighter or whiter colour, reduced incidence of gel formation, reduced residual organic dihalide compounds, such as 4,4'-difluorobenzophenone, and reduced residual polymerisation solvent such as reduced DPS residues. There is also a need for an industrially applicable process for preparing such PAEK or PEEK.

DETAILED DESCRIPTION

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components. When referring to the copolymer of the invention, the term "consisting essentially" means that the PEEK-PEDEK copolymer chain has at least 95% by weight only the specified repeat units and end units, with any other repeat units or end units present in the polymer chain arising typically from the presence of impurities in the monomers or further organic dihalide used in the manufacture of the copolymer. Deliberate inclusion of other monomers and end units up to 5% by weight may be permitted.

The final product from the manufacture of the copolymer of the invention, in addition to the copolymer itself, which consists essentially of the specified repeat units and end units, will also include, in addition to the polymer chains, certain reaction by-products from the manufacture, such as residual solvent, residual salts and residual monomer, as explained in more detail below. Hence, the use of the term "a PEEK-PEDEK copolymer consisting essentially of repeat units and end units" refers to the polymer itself, but it must be understood that the term encompasses the presence of residual by-products, along with the polymer chains, arising from the copolymer manufacture, present as up to say 5% by weight of the final product of manufacture, with the remaining 95% being the copolymer chains.

The term "consisting of" or "consists of" means including the components specified but excluding other components. Whenever appropriate, depending upon the context, the use of the term "comprises" or "comprising" may also be taken to include the meaning "consists essentially of" or "consisting essentially of", and also may also be taken to include the meaning "consists of" or "consisting of".

All references to L*, a* and b* values in the present application are when measured in accordance with Example 6 and with reference to the 1976 CIE L* a* b* colour space.

As used herein, the term "nucleophilic condensation" is used to refer briefly to the process for preparation of PAEK, particularly PEEK-PEDEK copolymer, by nucleophilic polycondensation of bisphenols with organic dihalide compounds, in the presence of alkali and/or alkali earth metal carbonates and/or bicarbonates in the presence of an aromatic sulfone polymerisation solvent such as diphenyl sulfone (DPS).

References to the monomers, solvents and other additives of the nucleophilic condensation reaction are meant to refer to these compounds with their commercially available purities, without further special purification.

The invention provides process for producing PEEK-PEDEK copolymer consisting essentially of repeat units of formula I:

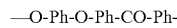
—O-Ph-O-Ph-CO-Ph-    I and repeat units of formula II:

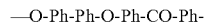
—O-Ph-Ph-O-Ph-CO-Ph-    II, and end units,
the process comprising
  a nucleophilic polycondensation of a mixture of dihydroxybenzene and dihydroxybiphenyl in a molar ratio of dihydroxybenzene:dihydroxybiphenyl from 50:50 to 95:5, with 4,4'-dihalobenzophenone in a reaction mixture comprising sodium carbonate and potassium carbonate in an aromatic sulfone solvent, at a reaction temperature rising to a temperature from 280° C. to 330° C. immediately prior to;
  b addition of a salt, which is a lithium, magnesium, calcium barium or strontium salt, or a mixture thereof, to the reaction mixture, wherein the molar ratio of the salt to potassium carbonate is from 6.0 to 10.0;
  c addition of a further organic dihalide to the reaction mixture, simultaneously with or subsequent to step b, wherein the molar ratio of the further organic dihalide to the mixture of dihydroxybenzene and dihydroxybiphenyl is from 0.009 to 0.035;
  d maintenance of the resulting reaction mixture's temperature at from 280° C. to 330° C. for from 20 to 180 minutes;
  a cooling of the resulting reaction mixture and recovery of the PEEK-PEDEK coplymer resulting from steps a to d from the reaction mixture;
  wherein in step a of the process:
  i the molar ratio of sodium carbonate to the mixture of dihydroxybenzene and dihydroxybiphenyl is from 0.95 to 1.15;
  ii the molar ratio of potassium carbonate to sodium carbonate is from 0.0025 to 0.0040;
  iii the molar ratio of the 4,4'-dihalobenzophenone to the mixture of dihydroxybenzene and dihydroxybiphenyl is from 1.005 to 1.010; and
  iv the aromatic sulfone solvent is present in the reaction mixture as 0.30 to 0.63 kg/mole of the mixture of dihydroxybenzene and dihydroxybiphenyl.

Preferably, the molar ratio of dihydroxybenzene:dihydroxybiphenyl is from 60:40 to 95:5, more preferably from 65:35 to 95:5.

In step a of the process, the reaction temperature may be maintained at a temperature from 280° C. to 330° C. until a desired molecular mass of the PEEK-PEDEK copolymer has been reached. This may be assessed by monitoring the measured torque of a stirrer motor driving a stirrer paddle in the reaction mixture which has been calibrated to correlate the measured torque with the molecular mass of PEEK-PEDEK copolymer reached by polycondensation. More preferably, the reaction temperature may be maintained at a temperature from 300° C. to 310° C. Preferably, the 4,4'-dihalobenzophenone of step a is 4,4'-difluorobenzophenone.

The dihydroxybiphenyl of step a is preferably biphenol, more preferably 4,4'-biphenol (also known as 4,4'-dihydroxybiphenyl).

The dihydroxybenzene of step a is preferably hydroquinone (benzene-1,4-diol)

Once the desired molecular mass of the PEEK-PEDEK copolymer has been reached, the salt which is a lithium, magnesium, calcium barium or strontium salt, or a mixture thereof, is added to the reactor to act as a reaction-stopping agent.

The salt is a reaction-stopping salt and may be an alkali metal salt other than a potassium or sodium salt, or an alkaline earth metal salt. Preferably, the salt may be selected from lithium chloride, calcium chloride, magnesium chloride, lithium bromide, lithium iodide lithium sulphate or mixtures thereof. In one example, the salt of step b is preferably lithium chloride, lithium sulphate or a mixture thereof.

The molar equivalents of the salt used as a reaction-stopping salt (relative to the moles of potassium carbonate present in step a of the process) may be at least 1.0 molar equivalents, preferably at least 4.0 molar equivalents, more preferably at least 6.0 molar equivalents, most preferably at least 7.0 molar equivalents. The molar equivalents of the salt may be less than 15.0 molar equivalents, preferably less than 12.0 molar equivalents, more preferably less than 10.0 molar equivalents, most preferably less than 9.0 molar equivalents.

The molar ratio of potassium carbonate may alternatively be defined as the molar ratio of potassium carbonate to bisphenol and may range from 0.0025 to 0.0046.

The further organic dihalide is added to the reaction mixture in step c, simultaneously with the addition of step b, or subsequent to completion of the addition of step b. For instance the addition of step c may commence part-way through the addition of step b and end after step b has been completed.

Preferably, the addition of step c is completed within 10 minutes of the commencement of step b, and more preferably, to prevent reduction in the PEEK-PEDEK copolymer molecular mass, step c does not commence until after the completion of the addition of step b. Typically, the addition of step b will be over a period of 5 minutes or less, as will the addition of step c.

Preferably, the further organic dihalide is 4,4'-difluorobenzophenone, and this is particularly preferred when the 4,4'-dihalobenzophenone of step a is 4,4'-difluorobenzophenone.

In step d, the resulting reaction mixture's temperature is maintained at from 280° C. to 330° C. for from 20 to 180 minutes. In this step, a preferred maintained temperature is from 300° C. to 310° C. The temperature may be maintained at a temperature from 280° C. to 330° C., preferably from 300° C. to 310° C., for from 20 to 180 minutes, preferably from 20 to 120 minutes, more preferably from 20 to 60 minutes, even more preferably from 30 to 60 minutes, prior to the cooling of step e.

In step e, the reaction mixture is typically cooled by discharging the reaction mixture onto a water-cooled surface.

Once cool, the PEEK-PEDEK copolymer may be recovered by processes known in the art. Typically, the crude cooled reaction product may be milled into a coarse powder, for instance with less than 2 mm maximum dimension. The powder may be washed in a separating column with an organic solvent, preferably a partially water-miscible solvent such as acetone, to remove organic impurities, specifically to remove aromatic sulfone solvent. Typically, acetone may be passed through the column until aromatic sulfone solvent, such as diphenylsulfone, is no longer precipitated out of organic wash on addition of water to the wash. The remaining product may then be washed with ambient temperature deionised water to remove the organic solvent, such as acetone, prior to further washing with hot (e.g. 90° C.) deionised water to remove water-soluble residues such as sodium and potassium salts. This may be monitored by monitoring the conductivity of the wash water. Once this has reached a minimal level, the material remaining may be dried to yield the recovered PEEK-PEDEK copolymer.

Typically, the reaction mixture in step a will be formed with the reaction mixture at a temperature of 130° C. or more, then heated to a target polymerisation range for the reaction mixture temperature from 280° C. to 330° C. Typically, the reaction mixture may be gradually heated to the target polymerisation range over a period of 1 to 6 hours before a temperature in the target polymerisation range is reached, This may be achieved by continuous heating, or by heating to intermediate "hold" temperatures, with the reaction mix held at a "hold" temperature such as 200° C. or 220° C. for 20 to 60 minutes the reaction mixture temperature reaches the target polymerisation range, the reaction mixture may be held at a temperature within the target polymerisation range for a period from 20 to 360 minutes, preferably from 30 to 240 minutes, more preferably from 60 to 90 minutes, prior to commencement of step b.

In the process, sodium bicarbonate or a mixture of sodium bicarbonate and sodium carbonate may be considered as equivalent to sodium carbonate based upon providing the same molar equivalence of sodium ions to the reaction mixture.

In the process, potassium bicarbonate or a mixture of potassium bicarbonate and potassium carbonate may be considered as equivalent to potassium carbonate based upon providing the same molar equivalence of potassium ions to the reaction mixture.

Preferably, the only inorganic salts present during step a are sodium carbonate, potassium carbonate, sodium bicarbonate and potassium bicarbonate. More preferably, only sodium carbonate and potassium bicarbonate are present as inorganic salts in step a.

The aromatic sulfone solvent used in the process may suitably be a solvent of formula

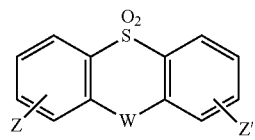

where W is a direct link, an oxygen atom or two hydrogen atoms (one attached to each benzene ring) and Z and Z', which may be the same or different, are hydrogen atoms or phenyl groups. A mixture of such solvents may be used. Examples of such aromatic sulfones include diphenylsulfone, dibenzothiophen dioxide, phenoxanthin dioxide and 4-phenylsulfonyl biphenyl. Diphenylsulfone is a preferred solvent. Step a of the process is preferably carried out in the presence of diphenylsulfone as solvent. Preferably, the aromatic sulfone solvent comprises 95% by weight or more of diphenylsulfone. More preferably, the aromatic sulfone solvent consists essentially of diphenylsulfone, by which it is meant that the solvent comprises at least 95% by weight of diphenylsulfone, preferably 98% by weight, more preferably 99% by weight.

In step a of the process the molar ratio of potassium carbonate to sodium carbonate is from 0.0025 to 0.0040 preferably from 0.0030 to 0.0036, more preferably less than 0.0034. Preferably step a of the process is carried out in the presence of greater than 0.0025 molar ratio of potassium carbonate. These preferred ranges provide benefits in terms of increased speed of reaction whilst avoiding side reactions, in particular excessive chain branching that can occur if the rate of reaction is too low.

The molar ratio of sodium carbonate to bisphenol in step a is from 0.95 to 1.15. The molar ratio may be greater than 0.95, preferably 1.00 or more, preferably greater than 1.00, more preferably greater than 1.01, most preferably greater than 1.02. The molar ratio may be less than 1.15, preferably less than 1.10, more preferably less than 1.06, most preferably less than 1.04. The molar ratio of carbonates to bisphenol, for carbonates other than sodium carbonate and potassium carbonate (and their equivalents if bicarbonates are included), used in step a of the process is preferably less than 0.05, more preferably less than 0.01.

Preferably, the only carbonates used in step a of the process are sodium carbonate and potassium carbonate (including their bicarbonate equivalents). Even more preferably, the bicarbonate equivalents are excluded.

In step b of the process the molar ratio of reaction-stopping salt, for example, lithium chloride and/or lithium sulphate, to potassium carbonate, is from 6.0 to 10.0, preferably from 7.0 to 9.0.

Step a of the process has the molar ratio of the 4,4'-dihalobenzophenone to the mixture of dihydroxybenzene and dihydroxybiphenyl from 1.005 to 1.010. This molar ratio is preferably from 1.006 to 1.008. The molar ratio of is defined as the number of moles of 4,4'-dihalobenzophenone used in step a of the process divided by the total number of moles of bisphenol (mixture of dihydroxybenzene and dihydroxybiphenyl) used in step a of the process.

The 4,4' dihalobenzophenone of step a may be 4,4'-dichlorobenzophenone, 4-chloro-4'-fluorobenzophenone, 4,4'-difluorobenzophenone or mixtures thereof. Preferably the 4,4' dihalobenzophenone is 4,4'-difluorobenzophenone.

Step a of the process is preferably carried out under substantially anhydrous conditions. Step a is preferably carried out with stirring. The temperature may increase in step a at a rate of greater than 0.25° C./min, more preferably greater than 0.50° C./min, even more preferably greater than 0.70° C./min, but preferably less than 1.50° C./min, more preferably less than 1.25° C./min, even more preferably less than 1.10° C./min. Preferably, however, prior to reaching a maximum temperature, step a of the process may further comprise one or more periods of time during which the temperature is held to remain constant. For example, step a of the process may further comprise one or more periods of time (e.g. for at least 20 minutes) during which the temperature is constant, for instance at a temperature from 170° C. to 210° C.; and/or at a temperature from 210° C. to 240° C.

In step a of the process the mixture of dihydroxybenzene and dihydroxybiphenyl and the 4,4'-dihalobenzophenone are preferably brought into contact with each other prior to contacting with the sodium and potassium carbonates, preferably in the presence of the aromatic sulfone solvent solvent, preferably diphenylsulfone, prior to the contacting with the carbonates.

Preferably in step a, after the maximum temperature is reached, the maximum temperature is maintained until a desired molecular mass of the PEEK-PEDEK copolymer has been reached. The desired molecular mass may be indicated by reaching a desired stirrer torque rise. A relationship can be obtained between the molecular mass of the polymer in solution and the torque experienced by a stirrer motor. This is for a defined mass, polymer concentration and temperature. Based on this relationship, a torque rise can be predicted for a desired molecular mass (number average or weight average molecular mass).

The further organic dihalide added in step c may be selected from one or more of 4,4'-difluorobenzophenone or 4,4'-dichlorodiphenylsulfone, 1,3-Bis(4-fluorobenzoyl)benzene, 4,4'-dichlorobenzophenone, and 1,3-bis(4-chlorobenzoyl)benzene. The further organic dihalide used as end-capping agent is more preferably 4,4'-difluorobenzophenone. As a result of the addition of further organic dihalide in step c, end units of the PEEK-PEDEK copolymer may be end-capped with halogen atoms, preferably fluorine atoms, which is understood to stabilise the PEEK-PEDEK copolymer. The molar ratio of the further organic dihalide to the mixture of dihydroxybenzene and dihydroxybiphenyl is from 0.009 to 0.035, preferably from 0.009 to 0.030 molar ratio, even more preferably from 0.009 to 0.025 molar ratio, most preferably from 0.009 to 0.022 molar ratio. A more preferred molar ratio is from 0.010 to 0.020 molar ratio, such as from 0.012 to 0.018.

The phenylene moieties (Ph) in each repeat unit I and II of the PEEK-PEDEK copolymer may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. It is generally preferred for the PEEK-PEDEK copolymer to be crystalline, for instance having a crystallinity of about 25 to 35% and, accordingly, the PAEK or PEEK preferably includes high levels of phenylene moieties with 1,4-linkages.

In a preferred embodiment, at least 95%, preferably at least 99%, of the number of phenylene moieties (Ph) in the repeat units of formula I and formula II have 1,4-linkages to moieties to which they are bonded. It is especially preferred that each phenylene moiety in the repeat unit of formula I and formula II has 1,4-linkages to moieties to which it is bonded.

Hence, the repeat unit of formula I preferably has the structure:

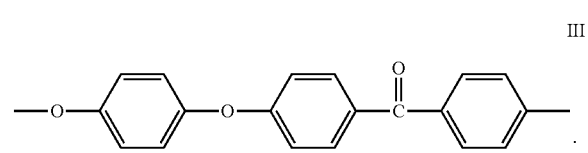

III

The repeat unit of formula II preferably has the structure:

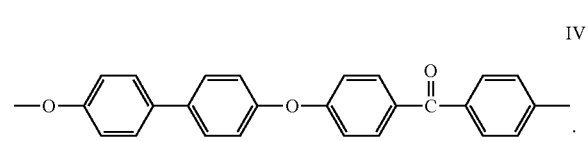

IV

In a particularly preferred embodiment of the process of the invention, there is provided a process for producing PEEK-PEDEK copolymer consisting essentially of repeat units of formula I:

—O-Ph-O-Ph-CO-Ph-  I and repeat units of formula II:

—O-Ph-Ph-O-Ph-CO-Ph-  II, and end units,
the process comprising
- a nucleophilic polycondensation of a mixture of hydroquinone and 4,4'-biphenol in a molar ratio of hydroquinone:4,4'-biphenol from 65:35 to 95:5, with 4,4'-difluorobenzophenone in a reaction mixture comprising sodium carbonate and potassium carbonate in an aromatic sulfone solvent, at a reaction temperature rising to a temperature from 280° C. to 330° C. immediately prior to;
- b addition of a salt, which is lithium chloride, calcium chloride, magnesium chloride, lithium bromide, lithium iodide, lithium sulphate or a mixture thereof, to the reaction mixture, wherein the molar ratio of the salt to potassium carbonate is from 6.0 to 10.0;
- c addition of further 4,4'-difluorobenzophenone to the reaction mixture, simultaneously with or subsequent to step b, wherein the molar ratio of the further 4,4'-difluorobenzophenone to the mixture of hydroquinone and 4,4'-biphenol is from 0.009 to 0.035;
- d maintenance of the resulting reaction mixture's temperature at from 280° C. to 330° C. for from 20 to 180 minutes;
- e cooling of the resulting reaction mixture and recovery of the PEEK-PEDEK copolymer resulting from steps a to d from the reaction mixture;

wherein in step a of the process:
- i the molar ratio of sodium carbonate to the mixture of hydroquinone and 4,4'-biphenol is from 0.95 to 1.15;
- ii the molar ratio of potassium carbonate to sodium carbonate is from 0.0025 to 0.0040;
- iii the molar ratio of the 4,4'-difluorobenzophenone compound to the mixture of hydroquinone and 4,4'-biphenol is from 1.005 to 1.010; and
- iv the aromatic sulfone solvent is present in the reaction mixture as 0.30 to 0.63 kg/mole of the mixture of hydroquinone and 4,4'-biphenol.

The process of the invention results in the formation of a PEEK-PEDEK copolymer comprising residual impurities of aromatic sulfone solvent, sodium salt and organic dihalide monomer from its formation by nucleophilic polycondensation. At the time of writing, it had not proved possible to remove all of these residual impurities when recovering PEEK-PEDEK copolymer on an industrial scale from commercially viable reaction mixtures in which the PEEK-PEDEK copolymer was formed by nucleophilic polycondensation. This is thought to be due to trapping of the residual impurities in the solidified PEEK-PEDEK copolymer so that not all impurities are accessible for removal by solvent extraction.

When the process is specifically for making a PEEK-PEDEK copolymer as described above, the PEEK-PEDEK copolymer may comprise residual impurities of aromatic sulfone solvent, particularly diphenylsulfone, sodium salt and organic dihalide monomer, particularly 4,4'-difluorobenzophenone, from its formation by nucleophilic polycondensation.

However, it has been found that the process of the invention surprisingly results in greater ease of extraction of such residual impurities, particularly the residual impurities of aromatic sulfone solvent and organic dihalide monomer, so that the levels of these impurities may be reduced to previously unattainably low values.

A typical prior art PEEK-PEDEK copolymer prepared by nucleophilic polycondensation in DPS as solvent in the presence of sodium carbonate, with 4,4'-difluourobenzophenone as the organic dihalide monomer, will comprise more than 0.063 wt. % of DPS even after extensive solvent/water washing to extract reaction by-products. Furthermore, the prior art PEEK-PEDEK copolymer may be prone to release residual 4,4'-difluourobenzophenone in certain environments such that the prior art PEEK-PEDEK copolymer may not be suitable for use in materials that come into contact with food, even after extensive solvent/water washing to extract reaction by-products.

Without wishing to be bound by any theory, it is thought that the process of the invention leads to the formation of a PEEK-PEDEK copolymer with unusually low levels of branching compared to PEEK-PEDEK copolymer formed in prior art nucleophilic polycondensation processes. It is thought that the copolymer of the invention exhibits reduced shear-thinning behaviour, compared to prior art PAEKs, as a consequence of reduced branching, so that compared to a prior art PAEK of similar molecular mass, the copolymer of the invention exhibits a lower melt viscosity at low shear rates, such as at $100 \text{ s}^{-1}$ making it more useful in forming articles of complex shape, particularly by additive manufacturing such as selective later sintering.

Powder Bed Fusion and Filament Fusion are both types of Additive Manufacture process, for which PEEK-PEDEK copolymer may be used. Powder Bed Fusion (alternatively known as Laser Sintering or Selective Laser Sintering—SLS) involves using a laser to melt and fuse together polymer particles into a 3-dimensional shape. There is no externally applied force to the powder (other than gravity) in order to promote fusion and the polymer is therefore not subject to shear forces. Powder Bed Fusion is a low-shear process, and requires a polymer with a low viscosity under low-shear conditions in order for the polymer particles to coalesce. It is not sufficient to achieve the viscosity requirement by simply using a lower molecular weight polymer, as a high molecular weight is required for high mechanical strength.

In Filament Fusion, a thin filament of polymer is extruded through a print-head, onto a base-plate in order to build up an object layer by layer. Whilst the polymer may experience significant shear in the extruder head, the consolidation and fusion process that occurs outside of the print head, is a low-shear process. The polymer at this point experiences no external forces. It is therefore necessary in both processes to have a polymer with a relatively low viscosity at low shear rates when the polymer is in a molten state. However, it is desirable to maintain the polymer molecular mass at a level that ensures good mechanical properties and toughness.

Hence, a further aspect of the invention provides a PEEK-PEDEK copolymer consisting essentially of repeat units of formula I:

—O-Ph-O-Ph-CO-Ph-  I and repeat units of formula II:

—O-Ph-Ph-O-Ph-CO-Ph-  II and end units,
wherein the molar ratio of repeat units of formula I to repeat units of formula II is from 50:50 to 95:5;
and wherein the ratio of the copolymer melt viscosity measured at a shear rate of 100 s$^{-1}$ to the copolymer melt viscosity measured at a shear rate of 10,000 s$^{-1}$, with the melt viscosity at each shear rate measured at 400° C. using capillary rheometry, is from 6.0 to 9.0. Preferably, this ratio is from 6.0 to 8.0, such as 6.0 to 7.5.

The melt viscosity may be suitably measured at 400° C. using a Malvern Instruments Rosand RH10 capillary rheometer, Although the melt viscosity measured at 100 s$^{-1}$ is higher than the viscosity measured at 10,000 s$^{-1}$ by a factor of 6.0 to 9.0, conventional prior art manufacturing processes typically yield PAEKs for which the ratio is greater than 9.0.

The melt viscosity of the PEEK-PEDEK copolymer may be measured by capillary rheometry using the RH10 capillary rheometer fitted with a tungsten carbide die, 0.5 mm (capillary diameter)×8.0 mm (capillary length). Approximately 5 grams of the copolymer is dried in an air circulating oven for 3 hours at 150° C. The extruder is allowed to equilibrate to 400° C. The dried polymer is loaded into the heated barrel of the extruder, a brass tip (12 mm long× 9.92±0.01 mm diameter) placed on top of the polymer followed by the piston and the screw manually turned until the proof ring of the pressure gauge just engages the piston to help remove any trapped air. The column of polymer is allowed to heat and melt over a period of at least 10 minutes. After the preheat stage the screw was is in motion so that the melted polymer is extruded through the die to form a thin fibre at the desired shear rate, while recording the pressure (P) required to extrude the polymer. The Melt Viscosity is given by the formula $$\text{Melt Viscosity} = \frac{P\pi r^4}{8LSA} kNsm^{-2}$$

where P=Pressure/kN m$^{-2}$
L=Length of die/m
S=ram speed/m s$^{-1}$
A=barrel cross-sectional area/m$^2$
r=Die radius/m The relationship between shear rate and the other parameters is given by the equation:

$$\text{Apparent wall shear rate} = \frac{4Q}{\pi r^3}$$

where Q=volumetric flow rate/m$^3$ s$^{-1}$=SA.

Hence, by adjusting the ram speed, S, the viscosity of the molten polymer may be measured at different shear rates, such as at 100, 1000 or 10,000 s$^{-1}$.

The PEEK-PEDEK copolymer of the invention preferably has a melt viscosity measured at 400° C. by capillary rheometry, as set out above, and at an intermediate shear rate of 1000 s$^{-1}$, of at least 0.05 kNsm$^{-2}$, preferably at least 0.10 kNsm$^{-2}$, more preferably at least 0.15 kNsm$^{-2}$. The PEEK-PEDEK may have a melt viscosity measured at 1000 s$^{-1}$ of less than 1.20 kNsm$^{-2}$, suitably less than 1.00 kNsm$^{-2}$. The melt viscosity measured at 1000 s$^{-1}$ may be employed as a measure or indicator of the molecular mass of the polymer.

The PEEK-PEDEK copolymer of the invention may comprise residual impurities of aromatic sulfone solvent, particularly diphenylsulfone, sodium salt and organic dihalide, particularly 4,4'-dihalobenzophenone, such as 4,4'-difluorobenzophenone, from its formation by nucleophilic polycondensation.

The PEEK-PEDEK copolymer of the invention may comprise higher levels of elements such as lithium, magnesium, calcium or mixtures thereof as a consequence of the use of salts of these elements as reaction stopping salt in the method of manufacture. Typically, as measured by ICP-OES (Inductively Coupled Plasma Optical Emission Spectrometry), the PEEK-PEDEK copolymer of the invention may comprise a total content of Li+Mg+Ca from 0.1 to 10.0 ppm by weight, such as from 0.4 to 6.0 ppm. The PEEK-PEDEK copolymer of the invention may comprise a total content of Li from 0.1 to 10.0 ppm by weight, such as 0.4 to 6.0 ppm when prepared by use of a lithium salt as a reaction-stopping salt.

The extent of carbonyl branching in PEEK-PEDEK copolymers may be determined according to the following method. 1.0 g of PEEK-PEDEK copolymer is accurately weighed out and added to a 100 ml volumetric flask. Concentrated sulfuric acid (70 ml, specific gravity 1.84 g/ml at 25° C., 95-98 wt. %) is added to the flask—for dissolution purposes (and to avoid the PEEK-PEDEK copolymer sticking in the neck of the flask) initially only three quarters of the volumetric flask is filled. The volumetric flask is capped and left on a shaker for around 18 to 30 hours (or, if using granules, until dissolved which was found to take as long as 2 to 4 days depending on the size of the granules). Once dissolved, the flask is filled to the 100 ml mark with further concentrated sulfuric acid and its contents shaken to provide a resultant solution.

The absorbance arising from the dissolved polymer of the samples at 550 nm is then measured using a twin beam instrument such as a Jasco V-630 spectrophotometer fitted with USE-753 cell holder. The spectrophotometer settings are absorbance mode, a measurement range of 1000 nm to 400 nm, data Interval of 0.2 nm, a UV/Vis bandwidth of 1.5 nm, a scan speed of 100 nm/min and a halogen D2/WI light source.

The test solution is placed in a 10 mm quartz cuvette (ref. 100-QS) and concentrated sulfuric acid (specific gravity 1.84 g/ml at 25° C., 95-98 wt. %) placed in a separate 100-QS cell to act as a reference sample. The sample path length is 10 mm. After running a baseline spectrum with the cell holders empty, the cuvette containing the dissolved PEEK-PEDEK copolymer sample (resultant solution) is placed in the 'sample' beam and the cuvette with the concentrated sulfuric acid sample is placed in the 'reference' beam.

The light from the halogen lamp is focused and enters the monochromator, the light being dispersed by the grating in the monochromator and focused onto an exit slit. The light that passes through the exit slit is monochromated. The light is split into two beams, one going to the polymer solution to be measured and the other to the sulfuric acid reference sample. The light that passes through the reference and the polymer sample is incident on a silicon photodiode detector. The intensity of the light passing through the reference cell ($I_0$) is measured for each wavelength of light passing through the spectrometer. Similarly, the intensity of the light passing through the sample cell (I) was also measured for each wavelength. Consequently, if the measured intensity of light passing through the sample cell (I) is less than the measured light passing through the reference sample ($I_0$), the polymer sample has thereby absorbed a proportion of the light passing through the sample. This measured difference in the intensity of light passing through the polymer and reference sample is converted into a measure of absorbance, A.

The relationship between A and the intensity of light passing through the polymer sample (I) and the reference sample ($I_0$) can be represented as:

$$A = \log_{10} \frac{I_o}{I}$$

The absorbance at light at a wavelength of 550 nm is measured from the resultant spectra output by the Jasco spectra Manager software.

The reference beam intensity after transmission through the reference is calibrated as 100% transmission or an absorbance measure of A=0, such that the value-$\log_{10}(T_S/T_R)$ for Absorbance corresponds solely to the contribution to absorbance from the dissolved polymer.

The measured absorbance provides an indication of the level of carbonyl branching of the dissolved PAEK.

The PEEK-PEDEK copolymers of the present invention absorb less light at a wavelength of 550 nm compared with prior art PEEK-PEDEK copolymers. This is indicative of a lower level of carbonyl branching for the PEEK-PEDEK copolymers of the present invention. The copolymers of the present invention are substantially more straight-chained than the prior art copolymers. This structural difference lends itself to a number of advantageous properties as explained herein.

The PEEK-PEDEK copolymer may be such that when the PEEK-PEDEK copolymer, is dissolved in concentrated sulfuric acid, for instance having a concentration of 95-98% by weight sulfuric acid, specific gravity of 1.84 g/ml at 25° C., to prepare a resultant solution with 1 g of the PEEK-PEDEK copolymer, per 100 ml of the resulting solution, the resultant solution has an absorbance from the PEEK-PEDEK copolymer of less than 0.20 at a wavelength of light of 550 nm.

Preferably the resultant solution may exhibit an absorbance from the dissolved PEEK-PEDEK copolymer of less than 0.18, more preferably less than 0.16, even more preferably less than 0.14, most preferably less than 0.12, at a wavelength of light of 550 nm. The resultant solution may exhibit an absorbance of greater than 0.02, such as greater than 0.04, for instance greater than 0.06, at a wavelength of light of 550 nm.

Without wishing to be bound by any theory, it is thought that the absorbance at 550 nm in the specified solution is an indicator of the presence of branching in the PEEK-PEDEK copolymer, so that low absorbance is thought to correspond to a low degree of branching in the PEEK-PEDEK copolymer.

It has surprisingly been found that the PEEK-PEDEK copolymer of the invention has an increased melt viscosity at low shear rates, has enhanced mechanical properties, has light colour and has a lower incidence of gels compared to PEEK-PEDEK copolymer made by prior art nucleophilic condensation. It has also been found that such PEEK-PEDEK copolymers, when treated by solvent washing to remove residual impurities from the nucleophilic condensation, can be purified to a greater extent than was achievable by solvent washing of prior art PEEK-PEDEK copolymer, such that the residual levels of organic dihalide compounds and of aromatic sulfone polymerisation solvent, particularly of DPS when DPS is used as polymerisation solvent, are lower than was previously attainable.

The absorbance that a resultant solution, obtained by dissolving PEEK-PEDEK copolymer in concentrated sulfuric acid at the specified levels explained above, is thought to correspond to the level of carbonyl branching of the PEEK-PEDEK copolymer, i.e. branching that has occurred via reaction at a carbonyl carbon to form a branch point, e.g. a triaryl carbinol. Such branch points are converted to stable carbonium ions in the presence of sulfuric acid which gives rise to the absorbance of light at a wavelength of 550 nm exhibited by the resultant solutions of PEEK-PEDEK copolymers comprising such branch points. The PEEK-PEDEK copolymer of the invention comprises lower levels of carbonyl branching than known PEEK-PEDEK copolymer as indicated by the absorbance measurement.

The molecular mass (also referred to as molecular weight) dispersity was formerly also referred to by the term "polydispersity index" or PDI, and corresponds to the value:

$$PDI = M_w/M_n$$

where $M_w$=weight average molecular mass and $M_n$=number average molecular mass.

PDI has a value equal to or greater than 1, with the value approaching 1 if all polymer chains in a sample are of uniform chain length.

For some addition polymerization, dispersity can be as high as 10 or more. However, for typical step growth polymerization of linear polymers carried out in batch reactors, most probable values of dispersity are around 2.6. Carothers' equation limits dispersity/PDI for linear polymers formed by step-growth from 2 monomers to minimum value of 2.

However, for branched polymers, the modified Carothers' equation leads to values in excess of 2, and in practice, for PAEKs formed by nucleophilic polycondensation, typical value considerably in excess of 2 are found in the prior art, indicating that conventional nucleophilic polycondensation leads to branching of the PEEK-PEDEK copolymer formed using prior art methods.

Surprisingly, the process of the present invention has been found to generate PEEK-PEDEK copolymers with low degrees of branching in which the molecular mass dispersity (PDI) approaches the minimum theoretical value of 2 for the polymer generated by the process.

The PEEK-PEDEK copolymer may have a PDI of less than 2.6, preferably less than 2.5, more preferably less than 2.4, even more preferably less than 2.3, most preferably less than 2.2.

The PEEK-PEDEK copolymer has a PDI of 2.0 or more.

The molecular mass dispersity, or polydispersity index, PDI, may suitably be measured as follows. A sample solution is prepared by dissolving 40 mg of the copolymer powder in 2 ml of 4-chlorophenol (PCP) at 205° C. The solution is then cooled, diluted to 20 ml with chloroform and filtered through a 0.45 μm PTFE syringe filter before analysis.

Gel Permeation Chromatography Conditions

| | |
|---|---|
| Columns | 2 × Agilent PLGel Mixed B, 300 × 7.8 mm |
| Solvent | 10% w/v PCP in chloroform |
| Flow rate | 1.0 ml/min |

-continued

| Temperature | 35° C. |
| Detector | Refractive index |

The data is collected and analysed using Viscotek Omnisec 5.1 software. The system is calibrated using Agilent Easi Cal polystyrene standards. All molecular mass results reported are expressed as 'polystyrene equivalent' molecular masses.

The PEEK-PEDEK copolymers of the present invention, measured by this route, have a far lower dispersity (PDI), i.e. a far narrower distribution of molecular mass, in comparison with prior art PEEK-PEDEK copolymers. Indeed, the PEEK-PEDEK copolymers of the present invention may exhibit PIDIs that approach a PDI of 2.0.

It will be understood that the PEEK-PEDEK copolymer of the invention is expected to be a statistical or random copolymer, rather than a block copolymer, as a consequence of the manufacturing method used for its formation.

The PEEK-PEDEK copolymer of low PDI may comprise residual impurities of aromatic sulfone solvent, particularly diphenylsulfone, sodium salt and organic dihalide monomer, particularly 4,4'-difluorobenzophenone, from its formation by nucleophilic polycondensation.

The invention further provides the use of the PEEK-PEDEK copolymer according to the invention in a component intended to contact food. The invention also provides components machined, formed, or moulded from, or coated with, a composition comprising or consisting of the PEEK-PEDEK copolymer of the invention intended to contact food. The composition may comprise from 30 to 100% of the PEEK-PEDEK copolymer of the invention with from 0 to 70% by weight of other components such as filler, for instance fibrous filler, colourants and the like. Preferably the composition comprises no other PAEK or PEEK, more preferably no other polymer.

The PEEK-PEDEK copolymer of the invention may comprise residual diphenylsulfone (DPS) present as 0.063% or less by weight (expressed as weight percent of the PEEK-PEDEK copolymer including the DPS). More preferably, the DPS may be present as 0.060% by weight or less. The DPS may be 0.055% by weight or less, for instance, 0.052% by weight or less. However, there will typically be at least 0.01% by weight of DPS present.

The level of DPS in the PEEK-PEDEK copolymer may be measured by using a standard method for measuring total sulfur in light hydrocarbons, spark ignition engine fuel, diesel engine fuel, and engine oil by ultraviolet fluorescence (ASTM Standard D5453-16).

The test method measures the amount of sulfur dioxide in the materials tested. The measurement of the amount of sulfur dioxide enables the calculation of the amount of diphenylsulfone (DPS) in the PEEK-PEDEK copolymer.

Without being bound by theory, the more linear PEEK-PEDEK copolymer chains of the present invention are believed to crystallise more slowly so that the crystallites crystallise around any residual DPS resulting in a more porous powder from which more DPS can be leached.

The level of extractable, residual 4,4'-difluorobenzophenone in PEEK-PEDEK copolymer may be measured using High-performance liquid chromatography (HPLC) on Miglyol 812 sample extracts. Samples of PEEK-PEDEK copolymer are placed in vessels of Miglyol 812 and the vessels were placed in an oven held at 175° C. The amount of residual 4,4'-difluorobenzophenone extracted from each PEEK sample is measured by analysing the Miglyol 812 using HPLC.

The Miglyol 812 samples are analysed by HPLC with diode array detection using an Agilent 1260 HPLC system. The HPLC column is an Ascentis express ES-CN, having dimensions 150 mm×3.0 mm and a particle size of 2.7 micrometres. Mobile phases comprise A=0.5% v/v acetic acid in water and B=0.5% v/v acetic acid in acetonitrile. The flow rate was set at 0.4 ml/minute. The run time is 26 minutes and the post equilibrium time is 15 minutes. The injection volume is 5 micro litres and the column temperature is 20° C. UV detection is set at 254 nm with a band width of 4 nm and the UV flow cell was 6 cm. The solvent gradient is as follows: at time (minutes)=0, A=95%, B=5%; at time (minutes)=5, A=95%, B=5%; at time (minutes)=20, A=30%, B=70%; at time (minutes)=21, A=0%, B=100%; at time (minutes)=25, A=0%, B=100%; and at Time (minutes) =26, A=95%, B=5%.

Miglyol 812 is a standard fatty food simulant used to monitor the amount of fat-extractable residues in polymers. PEEK-PEDEK copolymer is exposed via total immersion in 100 ml of Miglyol 812 and held at 175° C. The sample dimensions for the PEEK-PEDEK copolymer are: 2.5 cm×2.5 cm×2 mm. A sample of the Migliol 812 is analysed by HPLC to identify the amount of residual 4,4'-difluorobenzophenone extracted from the PEEK-PEDEK sample into the Miglyol 812 sample after the sample had been immersed in the Miglyol 812 for six hours at 175° C.

The measured levels of 4,4'-difluorobenzophenone extracted from the PEEK-PEDEK copolymer of the present invention into the Migylol 812 may be used to show that the PEEK-PEDEK of the present invention is suitable for use in articles intended to come into contact with food. Suitable levels for food use are, for instance, an extractable concentration of 0.05 mg/kg or less of residual 4,4'-difluorobenzophenone in the PEEK-PEDEK copolymer, when immersed in Miglyol 812 at 175° C. for six hours.

As a result of this characteristics of the PEEK-PEDEK copolymer of the invention, the polymer is of particular use for the preparation of devices and components for use in the food industry, particularly components that come into direct contact with food such as components of coffee machines, blenders, mixers and other food preparation equipment or components thereof (such as liners, gears, filters, sieves, belting and extrusion nozzles and the like). As such, the invention provides a component for a machine for use in food and/or beverage preparation, wherein the component comprises PEEK-PEKEK copolymer of the present invention. The PEEK-PEDEK copolymer of the present invention is also particularly suitable for coating belts of conveyors used in the food industry for conveying food products.

The colour of the PEEK-PEDEK copolymer of the invention may be tested using Minolta CR400 and CR410 chromameters. Powder samples may be first injection moulded into discs having a substantially flat surface for colour measurement using a 40t Engel Injection Moulder, and their colour evaluated using the Minolta CR400 chromameter. For each disc, the measuring head may be placed flat to the centre of the disc and a reading taken.

Granular samples having a granule size from 1 to 10 mm as determined by sieving may be placed into a granular materials attachment and their colour measured using the Minolta CR410 chromameter. The granular materials attachment is suitably inverted so that the granules were pressed against a glass window of the attachment when analysed. The granules should fill the window and be stationary when a reading is taken with the measuring head placed flat to the window when a reading is taken.

Colour may be measured in terms of L*, a* and b* values with reference to the 1976 CIE L* a* b* colour space. Illumination is by D65 light source The PEEK-PEDEK copolymer of the invention, when in the form of melt-filtered granules having a maximum dimension from 1 to 10 mm, preferably from 2 to 5 mm, may exhibit a lightness L* of greater than 56.0, an a* coordinate of greater than 1.3 but less than 5.0, and a b* coordinate of greater than 6.5 but less than 10.0 with reference to the 1976 CIE L* a* b* colour space.

It has surprisingly been found that the PEEK-PEDEK copolymer of the present invention is lighter and consequently appears whiter than known PAEKs or PEEKs. As detailed above, lighter/whiter PAEKs and PEEKs are useful because they enable ease of colour matching with similarly coloured components and their colour can be more easily adjusted.

Preferably the PEEK-PEDEK copolymer of the invention, when in the form of melt-filtered granules having a maximum dimension from 1 to 10 mm, has a lightness L* of greater than 58.0, more preferably greater than 59.0, even more preferably greater than 60.0, most preferably greater than 61.0.

Preferably the PEEK-PEDEK copolymer of the invention, when in the form of melt-filtered granules having a maximum dimension from 1 to 10 mm, has an a* coordinate of greater than 1.5 but less than 3.5, more preferably greater than 1.8 but less than 3.0, even more preferably greater than 2.0 but less than 2.5, most preferably greater than 2.1 but less than 2.4.

Preferably the PEEK-PEDEK copolymer of the invention, when in the form of melt-filtered granules having a maximum dimension from 1 to 10 mm has a b* coordinate of greater than 6.7 but less than 9.0, more preferably greater than 7.0 but less than 8.7, even more preferably greater than 7.2 but less than 8.5, most preferably greater than 7.4 but less than 8.4.

In a preferred embodiment the PEEK-PEDEK copolymer of the invention, when in the form of melt-filtered granules having a maximum dimension from 1 to 5 mm, has a lightness L* of greater than 60.0, an a* coordinate of greater than 2.0 but less than 2.5, and a b* coordinate of greater than 7.2 but less than 8.5. In a more preferred embodiment the PEEK-PEDEK copolymer in said granular form has a lightness L* of greater than 61.0, an a* coordinate of greater than 2.1 but less than 2.4, and a b* coordinate of greater than 7.4 but less than 8.4.

The invention also provides a device or article formed, moulded, machined from, or coated with, a composition comprising or consisting of a PEEK-PEDEK copolymer according to the invention. The composition may consist of the PEEK-PEDEK copolymer of the invention, or may include say 30 to 100% by weight of the PEEK-PEDEK copolymer, with from 0 to 70% by weight of other ingredients, for instance filler, such as fibrous filler, colourants and the like. Preferably no other PAEK and more preferably no other polymer is present in the composition The PEEK-PEDEK copolymer of the invention, when injection moulded, for instance as a disc, tablet, plaque or other form of sample, to provide planar surface from a powder of the PEEK-PEDEK copolymer, may have a lightness L* of greater than 65.0, an a* coordinate of greater than 0.2 but less than 5.0, and a b* coordinate of greater than 5.0 but less than 12.0, with reference to the 1976 CIE L* a* b* colour space.

Preferably the PEEK-PEDEK copolymer of the invention, in planar surface form, has a lightness L* of greater than 67.0, more preferably greater than 69.0, even more preferably greater than 70.0, most preferably greater than 71.0.

Preferably the PEEK-PEDEK copolymer of the invention, in planar surface form, has an a* coordinate of greater than 0.5 but less than 4.5, more preferably greater than 0.8 but less than 4.0, even more preferably greater than 1.0 but less than 3.5, most preferably greater than 1.1 but less than 3.2.

Preferably the PEEK-PEDEK copolymer of the invention, in planar surface form, has a b* coordinate of greater than 5.5 but less than 11.0, more preferably greater than 6.0 but less than 10.5, even more preferably greater than 6.5 but less than 10.0, most preferably greater than 7.0 but less than 9.7.

In a preferred embodiment the PEEK-PEDEK copolymer of the invention, in planar surface form, has a lightness L* of greater than 70.0, an a* coordinate of greater than 1.0 but less than 3.5, and a b* coordinate of greater than 6.5 but less than 10.0. In a more preferred embodiment the PAEK or PEEK in planar surface form has a lightness L* of greater than 71.0, an a* coordinate of greater than 1.1 but less than 3.2, and a b* coordinate of greater than 7.0 but less than 9.7.

In some embodiments, the PEEK-PEDEK copolymer of the invention may be compounded with one or more filler. The filler may include a fibrous filler or a non-fibrous filler. The filler may include both a fibrous filler and a non-fibrous filler. The fibrous filler may be continuous or discontinuous.

The fibrous filler may be selected from inorganic fibrous materials, non-melting and high-melting organic fibrous materials, such as aramid fibres, and carbon fibre.

The fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre. A fibrous filler may comprise nanofibers.

The non-fibrous filler may be selected from mica, silica, talc, hydroxyapatite (or hydroxylapatite), alumina, kaolin, calcium sulfate, calcium carbonate, titanium oxide, titanium dioxide, zinc sulfide, ferrite, clay, glass powder, zinc oxide, nickel carbonate, iron oxide, quartz powder, magnesium carbonate, fluorocarbon resin, graphite (including graphite nanoplatelets and graphene), carbon black, carbon powder, nanotubes (e.g. carbon nanotubes) and/or barium sulfate. The non-fibrous fillers may be introduced in the form of powder or flaky particles.

Preferably, the filler comprises or is one or more fillers selected from glass fibre, carbon fibre, aramid fibres, carbon black and a fluorocarbon resin. More preferably, the filler comprises or is glass fibre or carbon fibre. Such filler preferably comprises or is glass fibre.

A filled PEEK-PEDEK copolymer composition as described may include at least 20 wt %, or at least 40 wt % of filler. The filled composition may include 70 wt % or less or 60 wt % or less of filler.

The invention also provides an article which comprises, consists essentially of, or consists of a PEEK-PEDEK copolymer according to the invention or made by the process of the invention. The article may be a film, a stock shape such as a rod, or a machined article. The article may be an injection moulded article, a compression moulded article or an extruded article. Alternatively, the article may be formed using an additive manufacturing technique.

The invention also provides a method for manufacturing a three-dimensional object from the PEEK-PEDEK copolymer of the invention by additive layer manufacturing.

Additive layer manufacturing techniques include any one or more of filament fusion, laser sintering, powder bed fusion, ThermoMELT™ and micro pellet fusion.

The invention also provides a method for manufacturing a three-dimensional object from a powder by selective sintering by means of electromagnetic radiation, wherein the powder comprises, consists of essentially, or consists the PEEK-PEDEK copolymer according to the invention or made by the process of the invention.

The invention also provides a film or tape formed of a composition comprising or consisting of PEEK-PEDEK copolymer according to the invention or made by the process of the invention. The film may be extruded and may have a thickness from 5 µm to 100 µm or preferably from 5 µm to 50 µm.

The PEEK-PEDEK copolymer of the invention, when as a film may have a gel/black speck level of less than 300 ppm, preferably less than 250 ppm, more preferably less than 200 ppm, even more preferably less than 180 ppm, when assessed by a Brabender Film Quality Analyzer on amorphous extruded films. Extrusion conditions are:

Gravity fed, single screw 20 mm extruder set at 60 rpm
All heating zones set at 380° C.
Chill rollers set to 100° C.
Film speed set at 2.8 m/min.
Films 100 micron thick and 45 to 50 mm wide.

Gels and black specks detected by Brabender Film Quality Analyzer using a cold light source on a 1.2 m² surface of film.

Gels are defined as defects with a transmittance of 25 to 70%.

Black specks are defined as defects with a transmittance of below 25%.

Transmittance of above 70% is defined as transparent.

Film defect results are expressed as a parts per million (ppm) count by measuring the total number of pixels observed in a digital scan, and analysing how many pixels absorb light at a transmittance greater than the predefined transmittance as described above.

The PEEK-PEDEK copolymers of the present invention have a far lower content of gels/black specks than prior art PEEK-PEDEK copolymers. This means that the PEEK-PEDEK copolymers of the present invention are better suited for use in e.g. films and melt-spun fibres than the prior art materials.

As a result of this characteristic of the PEEK-PEDEK copolymer of the invention, the copolymer is of particular use for the preparation of polymeric film as there is a lower incidence of defects in the resultant films. This improves the effective yield of good quality, defect-free polymer film, and hence decreases the amount of waste material.

The PEEK-PEDEK copolymer of the invention may have a critical strain energy release rate of at least 17.5 $Jm^{-2}$, preferably at least 17.8 $Jm^{-2}$, more preferably at least 18.0 $Jm^{-2}$.

Preferably the PEEK-PEDEK copolymer of the invention has a stress intensity factor $K_{1C}$ of at least 5.000 MPa·√m, more preferably of at least or more than 5.050 MPa·√m.

A standard test method for strain energy release rate (ASTM D 5045-99) may be used use with test bars suitable for in-house production, to give a modified test method that was consistent with ductility behaviour in various applications. The modified test method uses energy release rate (per unit area) rather than stress-intensity as a measure of toughness.

Differences between ASTM test method D 5045-99 and modified test method:
Equipment An ASTM flex support (51 mm span) and anvil are used rather than the Bending Rig shown in the ASTM test method. Test bars are tested using an Instron 5567 tensometer with 30 kN load cell.

A loading-pin penetration and sample compression calibration (mentioned in 6.2.1 of the ASTM method) is not carried out.

A crosshead speed of 100 mm/min is used rather than the recommended 10 mm/min.
Sample Preparation The test bars are slightly trapeze shaped rather than the specified rectangular prisms of the ASTM method. The test bars are injection moulded from powder or from granules.

The sample size falls into the 'alternative specimens' category described in A1.1.2—it does not meet the specifications in 7.1.1. For the specimens tested W=12.7 mm, B=6.3 mm, a=4.7 mm.

The samples are machine notched as described in the ASTM method but no subsequent initiation of a natural crack is carried out (see 7.4.1 of the ASTM method).
Interpretation of Results A graph of Flexure Extension (x-axis) versus Flexure Load (y-axis) is plotted.

The line AB mentioned in 9.1.1 of the ASTM method is not drawn as a 'best straight line' but instead A was taken as the flexure extension result closest to a flexure load of 200 N, B was the flexure extension result closest to a flexure load of 300 N. A line is drawn between A and B which is extrapolated back to the x-axis and this point was labelled C. The line AB', described in the ASTM method, was not used.

Critical Strain Energy Release Rate ($G_{1c}$) is determined directly from the energy derived from integration of the load versus displacement curve as described in 9.3 of the ASTM method however it is integrated from point C (described above) up to $P_{max}$ rather than up to $P_Q$.

It is well known to persons skilled in the art that fracture toughness increases with melt viscosity (which itself increases with increasing molecular mass of the polymer). A material with higher fracture toughness properties is particularly advantageous for use in thicker walled parts e.g. stock shapes including rods, machined components, extruded articles and in composites generally.
Stress Intensity Factor $K_{1C}$ The fracture toughness is measured using a test method as described in ISO17281:2002 on injection moulded granules of the present invention. The fracture toughness is determined by measuring of the stress intensity factor $K_{1C}$ which is identified as the point at which a thin crack in a material begins to grow.

The PEEK-PEDEK copolymers of the present invention have a high resistance to brittle fracture when a crack is present, and any propagation of a crack through the PEEK-PEDEK copolymer of the present invention will undergo more ductile fracture.

As a result of this characteristic of the PEEK-PEDEK copolymer of the invention, the polymer is of particular use for the preparation of formed and moulded enclosures for electronic devices, particularly portable electronic devices which may be easily dropped, for instance portable smartphones and tablets.

For example, a casing for an electronic device form a composition comprising, substantially consisting of or consisting of PEEK-PEDEK of the present invention is provided. A casing for an electronic device includes an enclosure for a portable device such as a smart phone. The enclosure may be a moulded enclosure. Alternatively, the enclosure may be formed through an additive manufacturing process. An enclosure comprising, substantially consisting of or consisting of PEEK-PEDEK copolymer of the present invention is particularly good at withstanding the stresses and strains of prolonged everyday use because the PEEK-PEDEK copolymer of the present invention has a high resistance to brittle fracture. Furthermore, enclosures comprising PEEK-PEDEK copolymer of the present invention are more able to withstand defects formed during manufacture of the enclosures, since small manufacturing defects can cause cracks that can propagate through the enclosures, and the PEEK-PEDEK copolymer of the present invention is more resistant to brittle fracture than prior art PEEK-PEDEK copolymers.

The composition of the casing may comprise from 30 to 100% of the PEEK-PEDEK copolymer of the invention with from 0 to 70% by weight of other components such as filler, for instance fibrous filler, glass filler, colourants and the like. Preferably the composition of the casing comprises no other PAEK or PEEK, more preferably no other polymer.

The present invention also provides a pack comprising the PEEK-PEDEK copolymer of the invention, preferably in the form of powder, pellets and/or granules.

The pack may include at least 1 kg, suitably at least 5 kg, preferably at least 10 kg, more preferably at least 14 kg of material of the polymeric material. The pack may include 1000 kg or less, preferably 500 kg or less of the polymeric material. Preferred packs include 10 to 500 kg of the polymeric material.

The pack may comprise packaging material (which is intended to be discarded or re-used) and a desired material (which suitably comprises the polymeric material). The packaging material preferably substantially fully encloses the desired material. The packaging material may comprise a first receptacle, for example a flexible receptacle such as a plastics bag in which the desired material is arranged. The first receptacle may be contained within a second receptacle for example in a box such as a cardboard box.

The invention also provides a pipe or sheath formed from a composition comprising or consisting of the PEEK-PEDEK copolymer according to the invention or made by the process of the invention.

The invention also provides a method for forming a pipe or sheath by extrusion of a composition comprising or consisting of PEEK-PEDEK copolymer according to the invention or made by the process of the invention.

A specific embodiment of the invention will now be described:

Example 1

Preparation of PEEK-PEDEK Copolymer 1
(PEEK-PEDEK 75:25)

The following describes the preparation of PEEK-PEDEK copolymer by a process according to the invention on a laboratory scale. 4,4'-difluorobenzophenone (109.84 g, 0.504 mol), hydroquinone (0.375 mol, 42.30 g), 4,4'-biphenol (0.125 mol, 23.25 g) and diphenyl sulfone (225.43 g, 1.033 mol) were weighed into a 0.5 L flask and subjected to an inert nitrogen atmosphere at room temperature overnight. Reactants were then heated to 150° C. During this time the reagents were stirred at 20 rpm for 20 minutes, prior to increasing stirrer speed to 70 rpm for the remainder of the reaction.

Sodium carbonate (54.59 g, 0.515 mol) and potassium carbonate (0.242 g, 1.75 mmol) were added to the reaction mixture over a two minute time period. The reaction temperature was increased to 312° C. at 1° C. min$^{-1}$. A temperature of 312° C. was maintained until the desired stirrer torque rise was observed.

At this point, lithium sulphate (0.769 g, 0.007 mol) was added in one portion, and immediately afterwards, 4,4'-difluorobenzophenone (2.18 g, 0.010 mol) was added in one portion in order to control molecular mass. After a further thirty minutes, the opaque off-white coloured crude product was discharged from the vessel onto a metal tray to cool and solidify.

Once cool, the crude product was milled into a coarse powder (<2 mm maximum dimension). The powder was suspended in acetone in a separating column, and washed with acetone to remove organic impurities, namely diphenyl sulfone solvent. Acetone (~1 L) was slowly passed through the column until diphenyl sulfone solvent no longer precipitated out of organic wash on addition of water. The remaining product was then washed with cold deionised water to remove acetone (~1 L), prior to hot deionised water (~2 L) to remove aqueous by products. Once the conductivity of leachate was measured to be <2 µS using a conductivity probe, the material remaining in the column was dried in an oven overnight, yielding an off-white powder product.

The melt viscosity (MV) for the resulting polymer was measured at 1000 s$^{-1}$ and found to be 0.27 kNsm$^{-2}$. The Tg was measured by DSC according to ISO 11357 and found to be 149° C. (quoted as onset temperature).

For the melt viscosities measured at 100 and 10,000 s$^{-1}$, the values obtained were 0.604 kNsm$^{-2}$ and 0.087 kNsm$^{-2}$, giving a value of 6.9 for the ratio of the copolymer melt viscosity measured at a shear rate of 100 s$^{-1}$ to the copolymer melt viscosity measured at a shear rate of 10,000 s$^{-1}$ at 400° C.

As comparison, PEEK prepared by a conventional manufacturing method and having a melt viscosity of 0.31 kNsm$^{-2}$ at 1000 s$^{-1}$ was measured to have a value of 9.2 for the ratio of the PEEK melt viscosity measured at a shear rate of 100 s$^{-1}$ to the PEEK melt viscosity measured at a shear rate of 10,000 s$^{-1}$ at 400° C. (values of 0.812 kNsm$^{-2}$ and 0.088 kNsm$^{-2}$ respectively)

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Attention is directed to all papers and documents which are filed concurrently with or previous to this specification in connection with this application and which are open to public inspection with this specification, and the contents of all such papers and documents are incorporated herein by reference.

In summary, a method for manufacture of PEEK-PEDEK copolymers is disclosed along with copolymers formed by the method and their use. The method includes a nucleophilic polycondensation of a mixture of dihydroxybenzene and dihydroxybiphenyl with 4,4'-dihalobenzophenone in a reaction mixture comprising sodium carbonate and potassium carbonate, in an aromatic sulfone solvent, at a reaction temperature rising to a temperature from 280° C. to 330° C. immediately prior to the addition of a reaction-stopping salt, such as LiCl or $Li_2SO_4$, to the reaction mixture. Further organic dihalide is subsequently added to the reaction mixture for end-capping of the copolymer. The resulting copolymer has reduced chain branching and reduced melt viscosity at low shear rate compared to prior art copolymer of comparable molecular mass.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A process for producing PEEK-PEDEK copolymer consisting essentially of repeat units of formula I:

      I and repeat units of formula II:

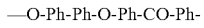      II, and end units,
the process comprising
   (a) nucleophilic polycondensation of a mixture of dihydroxybenzene and dihydroxybiphenyl in a molar ratio of dihydroxybenzene:dihydroxybiphenyl from 50:50 to 95:5, with 4,4'-dihalobenzophenone in a reaction mixture comprising sodium carbonate and potassium carbonate in an aromatic sulfone solvent, at a reaction temperature rising to a temperature from 280° C. to 330° C. immediately prior to;
   (b) addition of a salt, which is a lithium, magnesium, calcium barium or strontium salt, or a mixture thereof, to the reaction mixture, wherein the molar ratio of the salt to potassium carbonate is from 6.0 to 10.0;
   (c) addition of a further organic dihalide to the reaction mixture, simultaneously with or subsequent to step b, wherein the molar ratio of the further organic dihalide to the mixture of dihydroxybenzene and dihydroxybiphenyl is from 0.009 to 0.035;
   (d) maintenance of the resulting reaction mixture's temperature at from 280° C. to 330° C. for from 20 to 180 minutes;
   (e) cooling of the resulting reaction mixture and recovery of the PEEK-PEDEK copolymer resulting from steps (a) to (d) from the reaction mixture;
   wherein in step (a) of the process:
   (i) the molar ratio of sodium carbonate to the mixture of dihydroxybenzene and dihydroxybiphenyl is from 0.95 to 1.15;
   (ii) the molar ratio of potassium carbonate to sodium carbonate is from 0.0025 to 0.0040;
   (iii) the molar ratio of the 4,4'-dihalobenzophenone to the mixture of dihydroxybenzene and dihydroxybiphenyl is from 1.005 to 1.010; and
   (iv) the aromatic sulfone solvent is present in the reaction mixture as 0.30 to 0.63 kg/mole of the mixture of dihydroxybenzene and dihydroxybiphenyl.

2. A process according to claim 1 wherein the molar ratio of dihydroxybenzene:dihydroxybiphenyl is from 65:35 to 95:5.

3. A process according to claim 1 wherein the dihydroxybenzene is hydroquinone and the dihydroxybiphenyl is 4,4'-biphenol.

4. A process according to claim 1 wherein the 4,4'-dihalobenzophenone is 4,4'-difluorobenzophenone.

5. A process according to claim 1 wherein the further organic dihalide is 4,4'-difluorobenzophenone.

6. A process according to claim 1 wherein the aromatic sulfone solvent comprises 95% by weight or more of diphenylsulfone.

7. A process according to claim 1 wherein the aromatic sulfone solvent consists essentially of diphenylsulfone.

8. A process according to claim 1, wherein the salt is selected from lithium chloride, calcium chloride, magnesium chloride, lithium bromide, lithium iodide, lithium sulphate or a mixture thereof.

9. A process according to claim 8 wherein the salt is lithium chloride, lithium sulphate or a mixture thereof.

10. A PEEK-PEDEK copolymer prepared according to the process of claim 1,
   wherein the ratio of the copolymer melt viscosity measured at a shear rate of 100 $s^{-1}$ to the copolymer melt viscosity measured at a shear rate of 10,000 $s^{-1}$, with the melt viscosity at each shear rate measured at 400° C. by capillary rheometry, is from 6.0 to 9.0.

11. A PEEK-PEDEK copolymer according to claim 10 comprising impurities of aromatic sulfone solvent, sodium salt and organic dihalide monomer remaining from its formation by nucleophilic polycondensation.

12. A PEEK-PEDEK copolymer according to claim 10 wherein the molar ratio of repeat units of formula I to repeat units of formula II is from 65:35 to 95:5.

13. A PEEK-PEDEK copolymer according to claim 10 wherein when the PEEK-PEDEK copolymer is dissolved in concentrated sulfuric acid to prepare a resultant solution with 1 g of the PEEK-PEDEK copolymer per 100 ml of the resulting solution, the resultant solution has an absorbance contribution from the PEEK-PEDEK copolymer of less than 0.20 at a wavelength of light of 550 nm.

14. A PEEK-PEDEK copolymer according to claim 10 wherein the PEEK-PEDEK copolymer has a polydispersity index PDI=$M_W/M_N$, based on polystyrene equivalent molecular masses, of less than 2.5;

wherein $M_w$=weight average molecular mass and $M_n$=number average molecular mass.

15. A PEEK-PEDEK copolymer according to claim 10 wherein the PEEK-PEDEK copolymer has residual diphenylsulfone present as 0.063% or less by weight.

16. A food preparation device or a component thereof, comprising a PEEK-PEDEK copolymer according to claim 10.

* * * * *